United States Patent
Thijssen

[15] 3,649,294
[45] Mar. 14, 1972

[54] PROCESS FOR DEHYDRATING DEFATTING AND DEODORIZING ANIMAL TISSUE

[72] Inventor: Henricus A. C. Thijssen, Son, Netherlands

[73] Assignee: Continental Engineering, Ingenieursbureau voor de Procesindustrie N.V., Amsterdam, Netherlands

[22] Filed: Nov. 5, 1969

[21] Appl. No.: 874,214

[30] Foreign Application Priority Data

Nov. 6, 1968 Netherlands..........................68.15777

[52] U.S. Cl..................................99/18, 260/112, 260/412
[51] Int. Cl. ............................................................A23j 1/04
[58] Field of Search ....................260/412, 412.6, 412.8, 112; 99/14, 17, 18, 20, 7

[56] References Cited

UNITED STATES PATENTS 3,535,354  10/1970  Karnofsky............................260/412.8
3,076,708  2/1963   Cavanagh.....................................99/7

Primary Examiner—Raymond N. Jones
Assistant Examiner—Roger B. Andewelt
Attorney—Imirie, Smiley, Snyder and Butrum

[57] ABSTRACT

A process for dehydrating, defatting and deodorizing animal tissue, comprising the steps of comminuting animal tissue, such as whole fishes, diluting or not diluting the resulting tissue suspension with water or a volatile organic solvent, contacting the resulting tissue suspension in countercurrent relation with vapors of the same volatile organic solvent so as to effect an evaporation-extraction process in which a major part of water from the suspension is evaporated and drawn off with the solvent vapors and a major part of fats and odors, if present, is extracted simultaneously by liquid solvent, separating the resulting substantially dehydrated tissue suspension into a fat-containing solvent fraction and a protein-containing solids fraction, and, if desired, subjecting the resulting solids to an additional extraction with fresh liquid solvent. The end product is a protein concentrate suitable for human consumption or animal feed. The vapors drawn off from the evaporation-extraction process are subjected to rectifying distillation and solvent vapors freed from absorbed water are recycled to the evaporation-extraction process. A further part of solvent vapors feed from absorbed water may be used after condensation as a solvent for additional extraction of solids. The fat-containing solvent fractions from main extraction and additional extraction are distilled and this distillation may be combined with the rectifying distillation of water-enriched solvent vapors, said second solvent fraction thereby serving as a reflux liquid for that rectifying distillation.

7 Claims, No Drawings

PATENTED MAR 14 1972 3,649,294
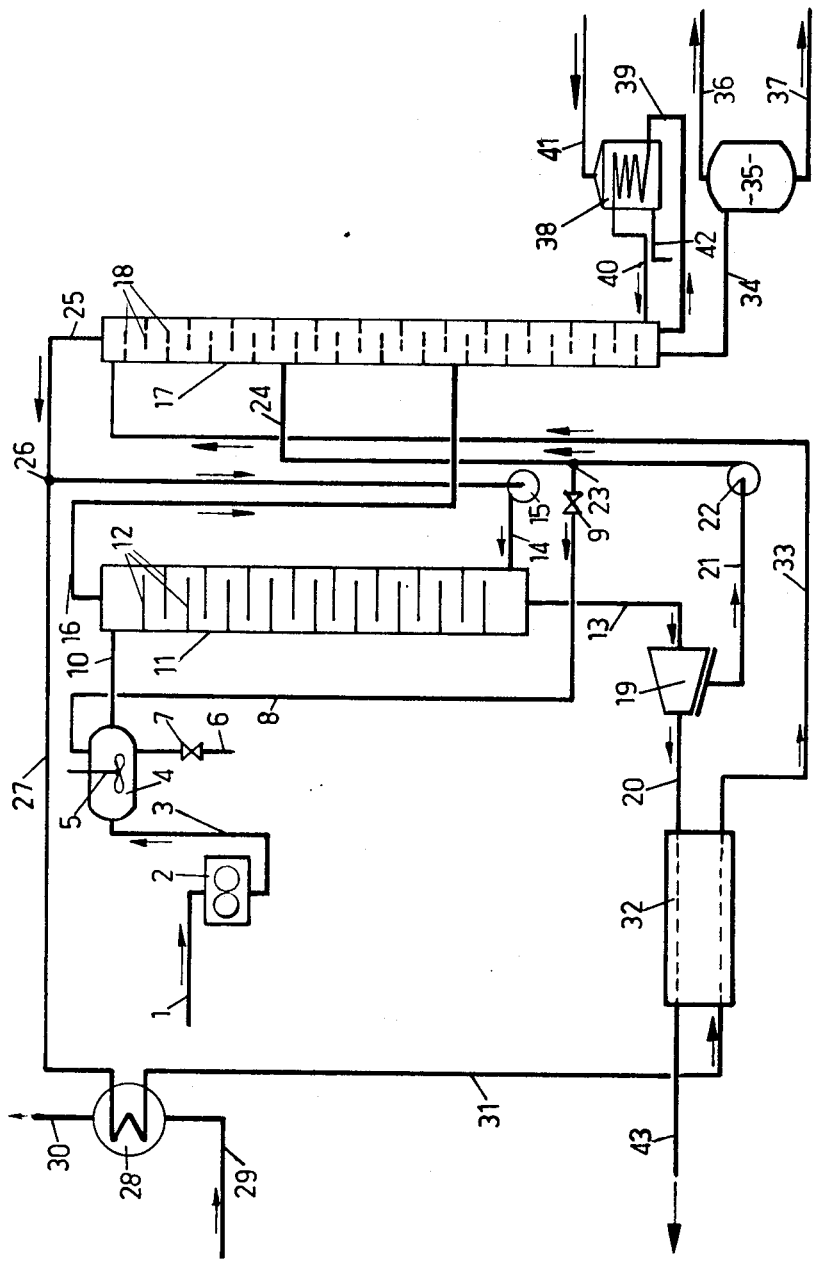
INVENTOR
HENRICUS A. C. THIJSSEN
BY Imirie, Smiley, Snyder & Butrum
ATTORNEYS

PROCESS FOR DEHYDRATING DEFATTING AND DEODORIZING ANIMAL TISSUE

This invention relates to a process and apparatus for dehydrating, defatting and deodorizing animal tissue in order to obtain a protein concentrate suitable for human consumption and animal feed.

A known process in this field comprises the steps of comminuting animal tissue, such as whole fishes, then precoagulating the comminuted tissue, suspending the resulting tissue slurry in a water-immiscible and azeotrope-forming organic solvent and subjecting the resulting suspension to a combined evaporation-extraction process wherein part of the organic solvent is continuously distilled off and replenished by fresh liquid solvent whilst another part of the organic solvent remains in liquid state. The solvent vapors formed during distillation will carry water from the animal tissue with them and on condensation, these vapors will form separate layers of water and liquid solvent, whereupon the liquid solvent may be recycled to the evaporation-extraction process for replenishing purposes. At the same time, the liquid solvent remaining in the process will extract fat and perhaps some odors from the animal tissue so that this tissue is gradually dehydrated and defatted. Evaporation is terminated when the distilling temperature rises too much and the remaining suspension is separated then into dehydrated, defatted tissue solids and a fat-containing liquid solvent. The solids are rich in proteins and may be used as such or further processed for adaptation to human food or animal feed.

A disadvantage of the known process is that only water-immiscible solvents are used, thus restricting the choice of solvents to a small group thereof, comprising e.g., ethylene dichloride and trichlorethylene. Further, it appears in practice that odors, if present, are not completely removed from the tissue by the evaporation-extraction process so that an additional extraction with another solvent is needed, this solvent being miscible with water or at least miscible therewith to a certain degree. Moreover, a relatively large amount of energy is required for precoagulating the comminuted tissue and for evaporating solvent and water whilst the required amount of cooling water is considerable too.

The invention has for an object to provide a process for dehydrating, defatting and deodorizing animal tissue wherein the disadvantages of the prior art are removed or at least diminished.

A further object of the invention is to provide a process for dehydrating, defatting and deodorizing animal tissue wherein several types of solvents may be used for effecting the aforesaid evaporation-extraction process, thus making the total process more flexible.

Another object of the invention is to provide a process for dehydrating, defatting and deodorizing animal tissue which allows main extraction and additional extraction with the same solvent.

A still further object of the invention is to provide a process for dehydrating, defatting and deodorizing animal tissue wherein a precoagulation of comminuted animal tissue is not necessary.

Another object of the invention is to provide a process for dehydrating, defatting and deodorizing animal tissue wherein the amount of energy required for the whole process is as low as possible.

The aforesaid objects are accomplished by the process of the invention which, in a certain aspect, comprises the steps of comminuting animal tissue, and contacting the resulting tissue suspension in countercurrent relation with vapors of a volatile organic solvent so as to effect a evaporation-extraction process in which a major part of water, as present in said suspension, is removed by evaporation together with part of said vapors whilst part of fat and part of odors, if present in the suspension, are removed by simultaneous extraction with a liquid other part of said solvent. Water-enriched solvent vapors are drawn off from said evaporation-extraction process and subjected to rectifying distillation so as to obtain solvent vapors freed from absorbed water, which vapors are recycled to said evaporation-extraction process. Also, a substantially dehydrated tissue suspension is drained from said evaporation-extraction process and separated into a fat-containing solvent fraction and a protein-containing solids fraction, which may, if desired, be subjected to an additional extraction with fresh solvent. The end product in either case is a protein concentrate suitable for human consumption and animal feed.

In this way, the objects of the invention may be reached in a simple way. Thanks to the use of solvent vapors in countercurrent relation to the suspension and thanks to the rectification of these vapors, the choice of solvents is no longer restricted because the requirement of water-immiscibility is obviated. A solvent may be chosen that is suitable both for removal of fat and for removal of odors from the animal tissue. Moreover, a strong economy in energy is obtained, the more so when the water-enriched vapors drawn off from the evaporation-extraction process are subjected to rectifying distillation without any intentional intermediate condensation and when they are recycled still in vapor form from this rectifying distillation step to the evaporation-extraction step. During dehydration of the suspension by countercurrent vapors, about one molecule of solvent vapors for every molecule of evaporating water is condensed. Since the molecular weight of organic solvents suitable for dehydrating, defatting and deodorizing animal tissue is substantially greater than the molecular weight of water, the tissue suspension is gradually converted to a diluted solvent-containing suspension when dehydration continues.

The volatile organic solvent may now be a liquid or liquid mixture which forms no azeotrope with water, which will be more voltatile than water in an aqueous solution and which also is a suitable solvent for fat and odors. An example of such a solvent is acetone. Alternatively, the solvent may be a liquid or mixture of liquids capable of forming with water an azeotrope comprising less than 25 percent by weight of water, which is more volatile than water in aqueous medium and which is a suitable solvent for fats and odors. Typical examples of such a solvent are ethanol and isopropanol.

The time of contact between suspension and solvent vapors during the evaporation-extraction process will be chosen such as to effect a sufficiently large dehydration of the suspension. Preferably, this contact time is controlled to provide such a low-residual water content in the suspension that later on, during additional extraction of the tissue, the water content of the solvent used for this additional extraction will remain unchanged. Another requirement with respect to the contact time is that there be sufficient opportunity for extraction of fat from the suspended tissue and preferably therefore, this contact time is controlled to provide not only for a sufficient reduction of water content in the suspension but also to provide for a fat concentration in the liquid phase which is at minimum 50 percent of the concentration at phase equilibrium between suspended tissue and liquid phase. In this way, the new evaporation-extraction process may be incorporated successfully in the total process of the invention. If the tissue suspension obtained by comminution is not sufficiently fluid during countercurrent treatment with solvent vapors, this fluidity may be improved by adding water to the tissue suspension and/or by diluting the mass with the same organic solvent used for dehydration and defatting.

This new way of effecting the evaporation-extraction process may, of course, provoke changes in other parts of the process. Thus, the additional extraction, to the extent needed, may be effected with the same solvent as is used in the main extraction, owing to the fact that the solvent as chosen will be suitable both for removing fat and odors. In that case, part of the water-impoverished solvent vapors, obtained in the rectification step of the water-enriched solvent, may be used after condensation as a fresh solvent for additional extraction of the dehydrated and partially defatted and partially deodorized tissue, this solvent being returned thereafter to the rectification step in order to be freed of absorbed fat. When the solvent coming from the additional extraction step is introduced into the rectification step in such a way that it will serve as a reflux liquid for solvent vapors at the same time, considerable savings of solvent regeneration costs may be obtained.

The water-impoverished suspension resulting from the evaporation-extraction process is separated into a tissue fraction poor in solvent which may be passed to an additional extraction step, and into a fat fraction rich in solvent which may be freed from solvent by distillation. Here too, the invention offers an opportunity for simplication since the distillation of said solvent-rich fat fraction is preferably combined with rectification of the water-enriched solvent vapors so as to obtain a solvent freed from absorbed water and fat on the one hand and a combined water-and-fat fraction which may be separated into its components by decantation on the other hand.

The invention will now be described on the basis of the appended drawing which diagrammatically shows an embodiment thereof by way of example.

According to the drawing, animal tissue to be treated is supplied through a conduit and is comminuted in a beater or grinder 2, e.g., a meat mincer.

The comminuted tissue is passed from the beater of grinder 2 via a conduit 3 to a blender 4 having an agitator 5, where it is converted to a homogeneous mass and where, if desired, other materials may be admixed therewith. Thus, water for dilution purposes may be added through a conduit 6 provided with a valve 7, and a volatile organic solvent may be added through a conduit 8 provided with a valve 9. The result of the mixing operation in blender 4 is a suspension of tissue solids in tissue liquids or a suspension of tissue solids in a one-phase or two-phase mixture of tissue liquids with water and/or organic solvent. This suspension is passed through a conduit 10 to a contacting apparatus 11. In the embodiment as shown, this contacting apparatus is a plate column having perforated plates 12 which may or may not be provided with downflow pipes. Under influence of gravitational force, the suspension flows downward through the column from its upper end and leaves this column through a conduit 13. At the same time, vapors of an organic solvent (the same material that may have been added through conduit 8) are flowing through this column in countercurrent relation to the suspension, i.e., from the bottom upward. These vapors are supplied through a conduit 14 by means of a pump 15 and leave the column through a conduit 16. The perforated plates ensure good contact between suspension and vapors.

When flowing through contacting apparatus 11, the vapors will take up water from the suspension. This water may be water from the animal tissue and added water that has been introduced (if any) through conduit 6. At the same time, a substantially equimolar amount of solvent vapors is converted to the liquid phase and becomes blended with the suspension. Thus, the vapors leaving column 11 through conduit 16 are enriched in water and the suspension leaving column 11 through conduit 13 has a low-residual water content. Moreover, an extraction process is taking place in the suspension during its flow through column 11, whereby part of the fat as present in the animal tissue and part of the odors as present therein are absorbed by the liquid solvent that has been formed by condensation or that has been added to the suspension in mixer 4. When the time of contact between suspension and vapors and consequently the residence time of the suspension in column 11 is chosen correctly, the residual water content in the suspension will have such a low-value that later on, during additional extraction with fresh solvent, the water content of that fresh solvent will not substantially be altered, and moreover, at least 50 percent of the phase equilibrium between suspended tissue solids and suspension liquids in column 11 will be reached.

The vapors leaving column 11 enter a conduit 16 and are passed without any intentional condensation on to a rectifying distillation column 17 provided with a plurality of perforated plates 18. In this column, a separation between water and solvent is effected and the solvent is recycled in vapor form to contacting apparatus 11 via conduits 25 and 14. The degree of separation between water and solvent in column 17 will depend strongly on the nature of the solvent but need not exactly be complete: it suffices that the solvent in column 17 is concentrated such that this solvent, on recycle to column 11 in vapor form is capable of dehydrating the suspension in that column to a desired level. In that case, the vapors leaving column 17 through conduit 25 are not exactly "anhydrous" but may be termed "poor in water."

The suspension of tissue solids in solvent leaving contacting apparatus 11 through conduit 13, is fed to a centrifuge 19 or equivalent apparatus and is separated therein into a solvent-impoverished tissue fraction and a tissue-free solvent fraction. The former fraction enters conduit 20 and is passed to an additional extraction step whilst the latter fraction comprising a major part of fat from the animal tissue is drained off through a conduit 21 by means of a pump 22. Reference character 23 denotes a branching point in the solvent conduit through which it is possible, if desired, to recycle part of this solvent fraction to mixer 4 via valve 9 and conduit 8 in order to dilute the suspension of comminuted fresh animal tissue therein; whilst the residual part of the solvent is passed through conduit 24 to rectification column 17 for separation into fat and solvent. This separation does not affect the operation of rectifying column 17.

Part of the vapors leaving rectifying column 17 at its upper end through conduit 15, are branched off at 26 and passed through conduit 27 to cooler 28 for condensation purposes. This cooler 28 is operated with cooling water supplied through conduit 29 and removed through conduit 30. The condensed water-impoverished solvent enters conduit 31 and is passed to an apparatus 32 for the additional extraction step where it is contacted with a solid tissue fraction supplied through conduit 20. In apparatus 32, the solvent will absorb part of the residual fat and part of the residual odors from the tissue, thus reducing the fat and odor content in the tissue fraction to a desired end value. Further, the solvent in apparatus 32 will absorb substantially no additional amount of water from the tissue fraction, due to the fact that the water content in the tissue has been reduced sufficiently in column 11 (if an equilibrium in water contents between outgoing suspension and incoming vapors has been established in the bottom part of column 11, then the same equilibrium between tissue fraction and solvent will exist in apparatus 32 because the solvent has the same composition as the vapors in conduit 14). Thus, the solid product leaving apparatus 32 through conduit 43 has been freed from water, fat and odors in a desired degree and forms a protein concentrate which after drying will be suitable for human consumption or animal feed. The solvent leaves the apparatus through conduit 33 and is recycled to rectification column 17. It enters the column at its upper end so that it may serve here as reflux liquid for escaping solvent vapors. The presence of fat in this reflux liquid will not affect the operation of rectification column 17.

A liquid fraction comprising fat and water is drained off from the bottom of distillation column 17 through conduit 34. This fraction is passed to a separator of decanting device 35 and is separated therein into its components, the fat being discharged in liquid form through conduit 36 and the water being discharged through conduit 37.

The energy required for rectifying distillation is provided by a circulation evaporator 38 wherein part of the liquid from column 17, supplied through conduit 39, may evaporate. The vapor-liquid mixture is returned then to column 17 through conduit 40. Steam is fed to the evaporator through a conduit 41 and condensed steam is drained off through conduit 42. It appears that the energy consumption is very low due to the fact that dehydration of the suspension is effected with solvent vapors. Therefor, the required energy is limited to the energy needed for evaporation of the reflux liquid. The arrangement of devices and apparatuses as shown in the drawing permits a continuous operation of the whole process.

Further details of the invented process and apparatus may be derived from the following two examples of execution.

EXAMPLE 1

One-hundred kg./hr. of thawed, deep-frozen haddocks, having a water content of 77 percent and a fat content of 1 percent by weight based on total weight, are comminuted in grinding apparatus 2 and fed to mixer 4. Apparatus 2 is a meat mincer provided with a sieve plate having holes of 5 mm. diameter. An amount of 50 kg./hr. of isopropanol containing 15 percent by weight of water is added to mixer 4 through conduit 8. The suspension leaving the mixer has a liquid phase which comprises 66.5 percent by weight of water and 33.5 percent by weight of isopropanol on protein-free and fat-free basis. This suspension is fed to the upper end of apparatus 11.

Contacting apparatus 11 is constructed as a plate column having a diameter of 600 mm., a length of 7,000 mm. and 15 plates. The plates have perforations of 14 mm. diameter. An amount of 750 kg./hr. isopropanol vapors having a water content of about 15 percent by weight is fed to the bottom of column 11 through conduit 14. The vapors leaving column 11 at its upper end through conduit 16 (655 kg./hr.) comprise about 22 percent by weight of water and are passed to distillation column 17.

The liquid suspension leaving column 11 at its bottom through conduit 13 (245kg./hr.) has about 18 percent by weight of water in its liquid phase. In separator 19, this liquid is separated into a solvent-impoverished tissue fraction and 200 kg./hr. of fat-containing solvent fraction. 50 kg./hr. of this solvent fraction is passed to mixer 4 through valve 9 and conduit 8, whilst the remaining 150 kg./hr. of solvent fraction is passed to distillation column 17 and introduced therein at the 10th plate from the top.

Distillation column 17 has 30 plates. The diameter of column 17 above the 8th plate from the bottom is 600 mm. and below that plate 400 mm. The plate spacing is also 400 mm.

Eleven-hundred and fifty kg./hr. of vapors leave column 17 through conduit 25 and 750 kg./hr. thereof are passed to column 11 by means of pump 15. The remaining 400 kg./hr. are condensed in cooler 28. The condensed liquid comprising about 15 percent by weight of water is passed through conduit 31 to apparatus 32 for the additional extraction step. In this apparatus 32, the tissue fraction coming from centrifuge 19 is freed substantially completely from residual fat content. Discharged from apparatus 32 is 18 kg./hr. of protein concentrate wherein the residual fat content has been reduced to 0.1 percent by weight. This fat content is based on dry solids after removal of bones and skins.

The fat-containing solvent (400 kg./hr.) leaving the apparatus 32 is recycled through conduit 33 to the topmost plate of distillation column 17 and serves as a reflux liquid for that column.

The bottom product of column 17 drained off through conduit 34 comprises all water and fat obtained from the fish.

To provide the energy needed for rectification, about 140 kg./hr. of steam is used in evaporator 38. The total energy consumption including that required for removal of solvent from protein concentrate, is only 8 kg. steam per kg. of dry protein mass.

EXAMPLE 2

One-hundred kg./hr. of thawed, deep-frozen mackerels having a water content of 72 percent by weight and a fat content of 10 percent by weight based on total weight, are comminuted in grinding apparatus 2 and fed to mixer 4. Apparatus 2 is a meat mincer provided with a sieve plate having holes of 5 mm. diameter. The mass leaving mixer 4 is fed to the upper end of contacting apparatus 11.

Contacting apparatus 11 is constructed as a plate column having a diameter of 600 mm., a length of 7,000 mm. and having 15 plates. The plates have perforations of 14 mm. diameter. An amount of 750 kg./hr. of isopropanol vapors having a water content of about 15 percent by weight is fed to the bottom end of column 11. The vapors leaving column 11 through conduit 16 (655 kg./hr.) comprise about 24 percent by weight of water and are passed to distillation column 17. The suspension (175 kg./hr.) leaving the bottom part of column 11 has a water content of about 17.5 percent by weight in its liquid phase and is passed to centrifuge 19 wherein it is separated into a solvent-impoverished tissue fraction and 160 kg./hr. of fat-containing solvent fraction. The solvent fraction is passed to distillation column 17 and introduced therein at the 10th plate from the top.

Distillation column 17 has 30 plates. The diameter above the 8th plate from the bottom is 600 mm. and the diameter below that plate is 400 mm. The plate spacing is also 400 mm. An amount of 1,150 kg./hr. of vapors leaves column 17 through conduit 25 and 750 kg./hr. thereof is passed to column 11 by means of pump 15. The remaining 400 kg./hr. are condensed in cooler 28. The condensed liquid comprises about 15 percent by weight of water and is passed through conduit 29 to apparatus 32 for the additional extraction step, where the tissue fraction coming from centrifuge 19 is freed substantially completely from residual fat content. Discharged from apparatus 32 is about 18 kg./hr. of protein concentrate, wherein the residual fat content has been reduced to 0.1 percent by weight. This fat content is based on dry solids after removal of bones and skins.

Four-hundred kg./hr. of fat-containing solvent is drained off from apparatus 32 and is recycled through conduit 33 to the topmost plate of distillation column 17 in order to serve as a reflux liquid.

The bottom product of column 17 drained off through conduit 34 comprises all water and fat from the fish.

To provide the energy needed for rectification, about 140 kg./hr. of steam is used in evaporator 38. The total energy consumption including that for removal of solvent from the protein concentrate is somewhat less than 8 kg. of steam per kg. of dry protein mass.

It will be apparent to those skilled in the art that the invention is not to be restricted by the embodiments as shown and the examples as given since many variations are possible without leaving the scope of the appended claims.

What I claim is:

1. In a continuous process of treating fat and water-containing animal solids to yield a protein concentrate suitable for human and animal consumption, the steps of:
   a. comminuting said solids to form a suspension of comminuted solids in a liquid carrier which is at least partly composed of water obtained from the solids;
   b. passing the water-impoverished condensable vapor of an organic solvent for fat in countercurrent contacting relation with said suspension;
   c. supplying the condensable vapor of step (b) at a rate sufficient to condense only a part of such vapor in liquid form and evaporate water from said suspension to yield (1) residual, water-enriched vapor and (2) a suspension of comminuted solids in a solvent-enriched, water-impoverished and fat-containing liquid phase carrier;
   d. separating the solids of step (c) from the liquid phase carrier therefor; and
   e. passing the residual, water-enriched vapor of step (c) in countercurrent contact with the separated liquid phase carrier of step (d) while simultaneously removing a portion of reflux liquid obtained from such contact vaporizing it by the application of external heat and passing the vapor so obtained also in countercurrent contact with said separated liquid phase carrier of step (d) at a rate sufficient to yield the water-impoverished condensable vapor for step (b).

2. The process as defined in claim 1 wherein the vapor obtained by the application of external heat in step (e) is provided at a rate sufficient to yield the water-impoverished condensable vapor for step (b) plus an additional quantity of such vapor;
   f. condensing said additional quantity of vapor and extracting residual fat from the separated solids of step (d) therewith; and g. recycling the fat-enriched liquid solvent from step (f) as a reflux liquid in step (e).

3. The process as defined in claim 1 including the step of adding a liquid selected from the group consisting of water, said organic solvent and mixtures thereof to the comminuted solids prior to step (b).

4. The process as defined in claim 1 including the step of:
f. removing another portion of reflux liquid in step (e) and decanting same to separate water and fat.

5. A process as claimed in claim 1, wherein said volatile organic solvent is acetone.

6. A process as claimed in claim 1, wherein said volatile organic solvent is selected from the group consisting of ethanol and isopropanol.

7. A process as claimed in claim 1, wherein the time of contact between tissue suspension and vapors during step (b) is controlled to provide low-residual water content in said tissue suspension and a fat concentration in the liquid phase of said suspension which is at minimum 50 percent of the fat concentration at phase equilibrium between suspended tissue and liquid phase in said suspension.

* * * * *